Dec. 26, 1950     R. E. FROGGATT     2,535,403
APPLIANCE FOR DUAL-HEADING OF HOLLOW RIVETS
Filed July 23, 1947     2 Sheets-Sheet 1

Inventor
R. E. Froggatt

Dec. 26, 1950  R. E. FROGGATT  2,535,403
APPLIANCE FOR DUAL-HEADING OF HOLLOW RIVETS
Filed July 23, 1947  2 Sheets-Sheet 2

Inventor
R. E. Froggatt
By Glascock Downing Seebold
Attys.

Patented Dec. 26, 1950

2,535,403

UNITED STATES PATENT OFFICE 2,535,403

APPLIANCE FOR DUAL HEADING OF HOLLOW RIVETS

Robert E. Froggatt, Erdington, England

Application July 23, 1947, Serial No. 762,938
In Great Britain August 20, 1946

4 Claims. (Cl. 218—19)

This invention relates to a means for securing hollow rivets or nuts in position.

The invention comprises an appliance for securing the hollow cylindrical body in position, the appliance having in combination relatively movable members by which the pressure required for expanding the hollow body part can be exerted, and toggle mechanism for effecting relative movement of the said parts.

In the accompanying sheets of explanatory drawings:

Figure 1 is a part sectional side view illustrating one stage in the use of an appliance for securing a hollow rivet in position in accordance with the invention, and Figure 2 is a similar view to Figure 1 (with parts of the riveting appliance omitted) illustrating a later stage in the use of the appliance. Figures 3 and 4 are respectively views similar to Figures 1 and 2 illustrating a modified form of the invention.

Figure 1:
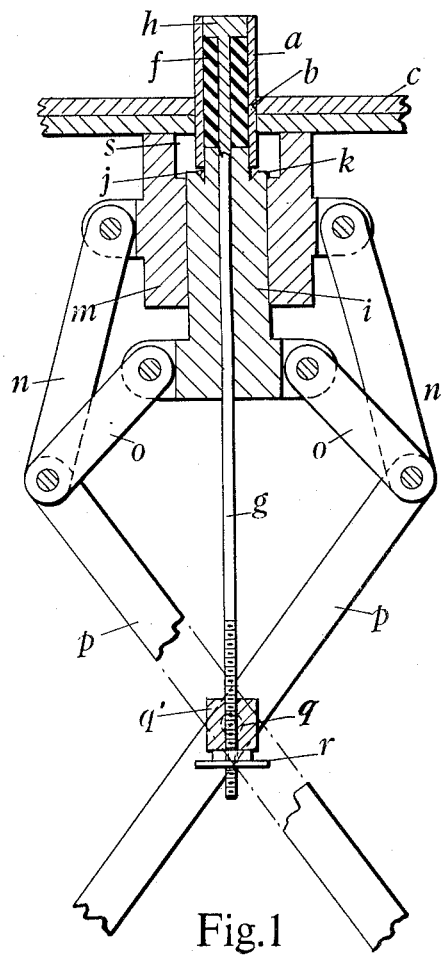
Figure 2:
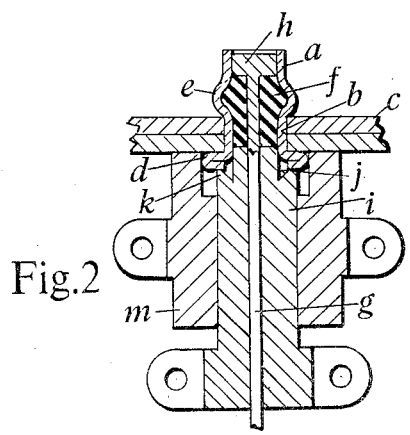

In carrying the invention into effect as shown in Figures 1 and 2, I employ a hollow cylindrical metal rivet $a$ of uniform thickness throughout its length and having open ends. The rivet $a$ is such that it can be inserted through a hole $b$ in workpieces $c$ to be secured together, and can be subsequently expanded under pressure within and at each end of the hole to secure the rivet in position as shown in Figure 2. In this figure the expanded parts of the rivet at the ends of the hole $b$ are respectively indicated by $d$ and $e$.

For enabling the hollow rivet $a$ to be secured in position, I employ for insertion into the interior of the rivet a rubber or like resilient bush $f$ which is shorter than the body but is longer than the hole $b$ through which the rivet is to be inserted, the external diameter of the bush being equal to or slightly less than the internal diameter of the rivet. Also I employ a riveting appliance having an axially movable stem $g$ which at one end is provided with a head $h$ and on which the bush $f$ is mounted with one end bonded to the head so that the bush can be inserted with the head end of the stem into the hollow rivet $a$. Slidably mounted on the stem $g$ is a sleeve $i$ (herein termed an anvil) of larger external diameter than the hollow rivet $a$. At one end the anvil $i$ is reduced in diameter to enable it to enter the hollow rivet $a$ and bear against the end of the bush $f$ remote from the head $h$ of the stem $g$. Also the reduced portion of the anvil $i$ terminates at its inner end in an annular shoulder $j$ through which the anvil can bear against the adjacent end of the hollow rivet $a$, the shoulder being formed with an annular recess $k$ for the purpose hereinafter described. The anvil $i$ is slidable in an annular guide $m$ adapted at one end to bear on the outer surface of one of the work pieces $c$ to be secured together by the hollow rivet $a$. Moreover, the anvil $i$ and guide $m$ are independently connected by toggle links $n$, $o$ to the adjacent ends of a pair of levers $p$ which are interconnected at positions intermediate to their ends by a pivot pin $q$. The end of the stem $g$ remote from the head $h$ is attached to the pivot pin $q$ of the levers $p$ in any convenient manner. Thus, the stem $g$ may be arranged to extend through a transverse hole in the pivot pin and a block $q^1$ thereon, and may be screw threaded for engagement by a securing nut $r$ arranged to act on the block. By adjustment of the nut $r$ the diameter of the bush $f$ may be slightly increased, if required, preparatory to the bush being inserted with the adjacent part of the stem into the hollow rivet $a$. After this insertion the levers $p$ are actuated to bring their ends closer together causing the head $h$ on the stem $g$ and the anvil $i$ to approach each other and exert axial compression on the bush $f$. The actuating effort exerted on the levers $p$ at this stage is, however, only sufficient to cause the bush $f$ to grip the interior of the hollow rivet $a$ tightly as a result of the radial expansion of the bush accompanying its axial compression, sufficient clearance being initially provided between the shoulder $j$ on the anvil $i$ and the adjacent end of the hollow rivet to allow the required movement of the anvil. After being attached to the bush $f$ on the stem $g$ as above described, the hollow rivet $a$ is inserted through the hole $b$ in the work pieces $c$ until the outer end of the guide $m$ is brought into contact with the adjacent work piece which forms a stationary abutment for the guide, the latter serving as a stop for determining the extent to which the hollow rivet is inserted through the hole. Increased actuating effort is thereupon exerted by hand or power on the levers $p$ so as to bring their ends still closer together and cause further relative movements of the stem $g$ and anvil $i$ the links connecting the guide $m$ to the adjacent ends of the levers $p$ constraining the movements of the stem and sleeve to simultaneous movements in opposite directions. As a result of these further movements the recessed shoulder $j$ on the anvil $i$ serves by its action on the adjacent end of the hollow rivet $a$ to buckle and expand this end of the rivet over the outer surface of the adjacent work piece $c$ in the manner indicated by $d$ in Figure 2, the buckled and expanded end finally assuming the form of a head of double thickness. At the same time the radial expansion of the bush $f$ which accompanies the additional axial compression imparted to the bush as a result of the increased actuating effort on the levers $p$, not only causes expansion of the hollow rivet $a$ into tight sealing and torque-resisting contact with the periphery of the hole $b$ in the work pieces $c$, but also causes an intermediate part of the hollow rivet $a$ to be expanded, as indicated by $e$ in Figure 2, over the outer surface of the other work piece $c$. The purpose of the annular recess $k$ in the shoulder $j$ on the anvil $i$ is to engage the adjacent end of the rivet $a$ and thereby initiate the buckling operation above mentioned. The extent to which the buckled end of the rivet $a$ is expanded may be determined by contact of the periphery of this end of the rivet with the periphery of an annular recess $s$ formed in the adjacent end of the guide $m$, or with the inner periphery of a sleeve (not shown) removably secured in this recess.

Figure 3:
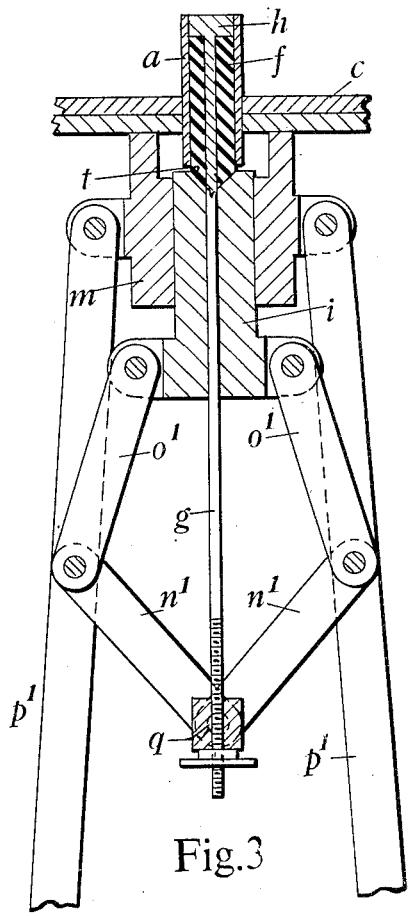
Figure 4:
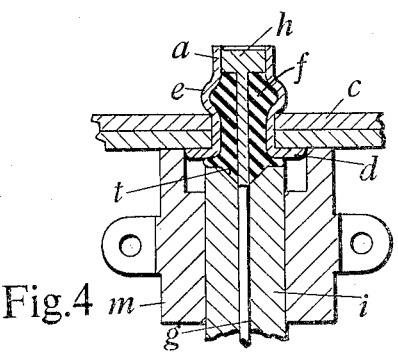

In cases where it is desired that the anvil $i$ shall expand without buckling the adjacent end of the rivet $a$, the shoulder $j$ may be of plain conical form so that it can impart a complementary flared form to the said end of the rivet, the adjacent end of the hole $b$ in the work pieces $c$ being countersunk to accommodate the flared end of the rivet. Alternatively, the bush $f$ may be initially arranged to project from the end of the rivet $a$ required to be expanded, and the operative end of the anvil may be formed with a recess for accommodating the projecting end of the bush. An example of this alternative is illustrated in Figures 3 and 4. In this example the projecting end of the bush $f$ is of conical form, and the operative end of the anvil $i$ is formed with a complementary recess $t$, the arrangement being such that the radial expansion of the bush which results from its axial compression between the anvil and the head $h$ on the stem $g$, serves not only to effect the expansion of an intermediate part $e$ of the rivet as in the example shown in Figures 1 and 2 but also to effect or assist in effecting expansion of the end $d$ of the rivet.

Instead of having the form shown in Figure 1, the toggle linkage may have the form shown in Figure 3. Thus it may consist of a pair of actuating levers $p^1$ each pivoted at one end to the guide $m$, a pair of toggle links $o^1$ connecting the anvil $i$ to the levers, and another pair of toggle links $n^1$ connecting the levers and the associated ends of the first mentioned toggle links to the pivot pin $q$ to which the stem $g$ is attached.

Figure 5:
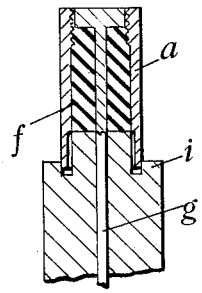
Figures 5 to 7 are similar sectional views illustrating respectively three successive stages in another modified tool according to the invention.
Figure 6:
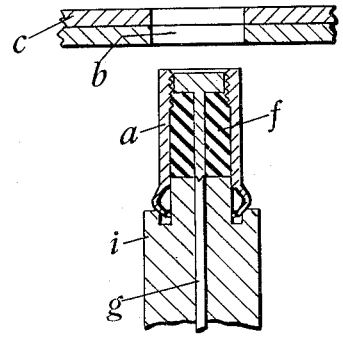
Figure 7:
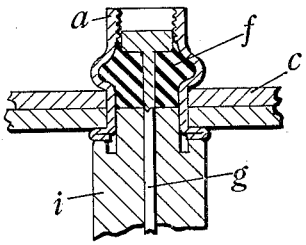

In the modification shown in Figures 5 to 7, the hollow rivet $a$ is formed with a stepped interior so that it is of greater thickness at one end than over the remainder of its length, and this end is internally screw threaded. Also the plain portion of the rivet is stepped internally so that the part of minimum thickness is adjacent to the end remote from the screw threaded end. Moreover, a rubber or like bush $f$ is inserted as above described into the rivet $a$, and the required expansion of the rivet is effected by axial movements of the stem $g$ and anvil $i$. As the plain end of the rivet is thinner than the remainder of the rivet, it follows that the buckling and expansion of this end takes place or commences to take place before the expansion of the intermediate part of the rivet. Consequently the buckling and expansion of the rivet end can be partially effected before the rivet is inserted into the hole $b$ in the work pieces $c$, and this condition is illustrated in Figure 6. Subsequently the rivet is inserted through the hole $b$ and the expanding operation is completed as above described, the final form of the rivet being shown in Figure 7.

Figure 8:
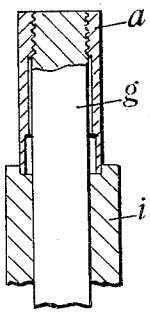
Figures 8 to 10 are respectively similar views to Figures 5 to 7 illustrating a further modification.
Figure 9:
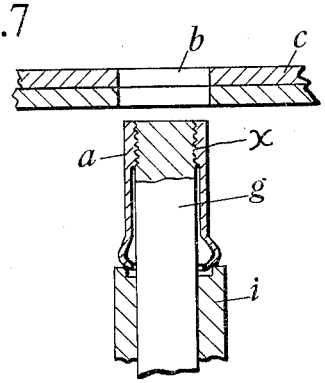
Figure 10:
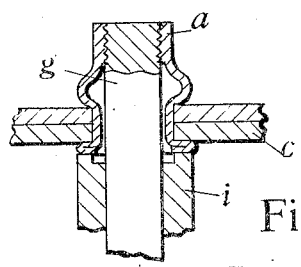

In the modification shown in Figures 8 to 10, the hollow rivet $a$ is similar to that shown in Figures 5 to 7, but in securing the rivet in position the rubber or like bush above described is dispensed with. Also the stem $g$ is of larger diameter than in the previously described example, and is screw threaded as indicated at $x$ at its outer end for engagement with the internally screw threaded end of the rivet $a$ so that relative movements of the stem and the anvil $i$ can serve by exerting endwise compression on the rivet to expand the latter as above described. After the rivet $a$ is attached to the stem $g$ as shown in Figure 8, the thinner end of the rivet is slightly expanded (as shown in Figure 9) by relative movements of the stem and the anvil $i$ preparatory to the rivet being inserted through the hole $b$ in the work pieces $c$, whereupon the rivet is secured in position as above described.

As the rivet employed in each of the examples shown in Figures 5 to 7 and 8 to 10 is hollow and screw threaded at the end remote from that to be expanded, the rivet can serve not only its normal purpose, but also to receive a screw (not shown) for attaching an additional part to the work pieces $c$ secured by the rivet.

In the foregoing I have described the application of the invention to rivets. The invention is, however, applicable in essentially the same manner to nuts which are required to be secured in a hole in a sheet metal or like part. Such a nut may be similar in form and secured in position in the same way as the hollow rivet shown in Figures 5 to 7 or 8 to 10. Moreover, the invention it not limited to the examples described as subordinate details may be varied to suit different requirements.

Having thus described my invention what I claim as new and desire to secure by Letters Patent is:

1. An appliance for inserting and securing a flangeless, cylindrical hollow rivet within an aperture in at least one stationary work piece, comprising a pair of coaxially disposed, oppositely movable pressure exerting members, one of said members constituting a stem insertable within the rivet and the other of said members constituting a sleeve of a diameter at least slightly in excess of the diameter of the rivet, said sleeve being slidable on said stem, means carried by the stem and cooperable with the rivet for securing the rivet to the stem exteriorly of the aperture so that the outer end portion of the stem together with the rivet secured thereto can be inserted through the aperture in the work piece, toggle mechanism connected to said stem and sleeve so that actuation thereof effects opposite relative movements of said stem and sleeve, so that this movement due to the cooperation of the means carried by the stem and the sleeve effects expansion of the rivet, an annular member surrounding said sleeve and having its outer end projecting forwardly of the outer end of the sleeve and engageable with the work piece when the stem and rivet are inserted through the aperture to limit the amount or rivet initially protruding through the aperture, and said toggle mechanism including means connected to said annular member to constrain the movements of the stem and sleeve to simultaneous movements in opposite directions, so that actuation of the toggle mechanism with the rivet inserted through the aperture and secured to the stem and with the annular member in continuous contact with the work piece effects continued opposite movements of the stem and sleeve to buckle portions of the rivet over the edges of both ends of the aperture to secure the rivet in place.

2. An appliance as claimed in claim 1 in which the means carried by the stem and cooperable with the rivet comprises a head on one end of said stem, and a resilient bush mounted on said stem, extending between said head and said sleeve and secured to said head so that said bush is insertable by said stem into said hollow rivet and is radially expansible in response to endwise compression exerted thereon by movement of said head and sleeve toward one another under the action of said toggle mechanism to initially frictionally engage said rivet to secure the same to said stem and thereafter radially expand said rivet.

3. An appliance as claimed in claim 1 in which the means carried by the stem and cooperable with the rivet comprises screw threads at one end of said stem for engagement with said rivet.

4. An appliance as claimed in claim 1 in which said toggle mechanism comprises in combination a pair of levers, a pivot interconnecting said levers at positions intermediate their ends and serving as an anchorage for said stem, toggle links connecting said sleeve to adjacent ends of said levers, and additional toggle links connecting said annular member to said ends of said levers.

ROBERT E. FROGGATT.

REFERENCES CITED

The following references are of record in the file of this patent:

UNITED STATES PATENTS

| Number | Name | Date |
| --- | --- | --- |
| 1,447,520 | Schade | Mar. 6, 1923 |
| 2,365,834 | Olmsted | Dec. 26, 1944 |
| 2,370,840 | Carlson | Mar. 6, 1945 |
| 2,399,442 | Luce | Apr. 30, 1946 |